(12) United States Patent
Miyawaki et al.

(10) Patent No.: US 12,057,741 B2
(45) Date of Patent: Aug. 6, 2024

(54) MOTOR PROVIDED WITH ROTOR

(71) Applicant: Panasonic Intellectual Property Management Co., Ltd., Osaka (JP)

(72) Inventors: Naoto Miyawaki, Osaka (JP); Takeru Maekawa, Osaka (JP); Yasushi Kamada, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 337 days.

(21) Appl. No.: 17/608,761

(22) PCT Filed: Apr. 16, 2020

(86) PCT No.: PCT/JP2020/016663
§ 371 (c)(1),
(2) Date: Nov. 4, 2021

(87) PCT Pub. No.: WO2020/230507
PCT Pub. Date: Nov. 19, 2020

(65) Prior Publication Data
US 2022/0255380 A1    Aug. 11, 2022

(30) Foreign Application Priority Data

May 15, 2019    (JP) ................................ 2019-092466

(51) Int. Cl.
*H02K 1/28*        (2006.01)
*H02K 1/278*      (2022.01)

(52) U.S. Cl.
CPC ............... *H02K 1/28* (2013.01); *H02K 1/278* (2013.01)

(58) Field of Classification Search
CPC ......... H02K 1/28; H02K 1/278; H02K 1/2781
See application file for complete search history.

(56) References Cited

U.S. PATENT DOCUMENTS

| 4,841,186 A | 6/1989 | Feigel et al. |
| 2010/0013350 A1 | 1/2010 | Fu |

(Continued)

FOREIGN PATENT DOCUMENTS

| CA | 3014912 A1 | 8/2017 |
| CN | 201623555 U | 11/2010 |

(Continued)

OTHER PUBLICATIONS

The Extended European Search Report dated Jun. 9, 2022 for the related European Patent Application No. 20805879.2.

(Continued)

*Primary Examiner* — Jue Zhang
(74) *Attorney, Agent, or Firm* — Rimon P.C.

(57) ABSTRACT

A rotor includes: a shaft; a rotor back yoke having a through hole defined in an axial center through which the shaft is inserted, the rotor back yoke being integrally and rotatably connected to the shaft; and magnets fixed to an outer peripheral surface of the rotor back yoke, the plurality of magnets being disposed with magnetic poles of different polarities being arranged alternately along a circumferential direction. The rotor back yoke includes a plurality of first cutout portions provided at predetermined intervals in the circumferential direction and extending from an inner peripheral surface of the rotor back yoke outward in a radial direction. Each of the plurality of first cutout portions extends along an axial direction, from one end surface to the other end surface of the rotor back yoke.

7 Claims, 6 Drawing Sheets

(56) References Cited

U.S. PATENT DOCUMENTS

| | | |
|---|---|---|
| 2012/0019097 A1 | 1/2012 | Kwon et al. |
| 2014/0117802 A1 | 5/2014 | Sugimoto |
| 2015/0061443 A1* | 3/2015 | Tanaka .................. H02K 1/278 |
| | | 310/156.08 |
| 2016/0204666 A1 | 7/2016 | Wata et al. |
| 2019/0214875 A1 | 7/2019 | Tsuruta et al. |
| 2020/0259391 A1 | 8/2020 | Han et al. |

FOREIGN PATENT DOCUMENTS

| | | |
|---|---|---|
| CN | 109314423 A | 2/2019 |
| JP | 55-145847 U | 10/1980 |
| JP | 3677752 B | 8/2005 |
| JP | 2007-014178 | 1/2007 |
| JP | 2008-187804 A | 8/2008 |
| JP | 2014-090574 | 5/2014 |
| JP | 6022077 B | 11/2016 |
| WO | 2011/042984 | 4/2011 |
| WO | 2019/027196 A1 | 2/2019 |

OTHER PUBLICATIONS

International Search Report of PCT application No. PCT/JP2020/016663 dated Jun. 30, 2020.

\* cited by examiner

MOTOR PROVIDED WITH ROTOR

CROSS-REFERENCE TO RELATED APPLICATIONS

This application is a U.S. national stage application of the PCT International Application No. PCT/JP2020/016663 filed on Apr. 16, 2020, which claims the benefit of foreign priority of Japanese patent application No. 2019-092466 filed on May 15, 2019, the contents all of which are incorporated herein by reference.

TECHNICAL FIELD

The present invention relates to a rotor and a motor including the rotor.

BACKGROUND ART

Conventionally, improvement of responsiveness of a motor has been required, and various techniques responding to this demand have been proposed.

For example, PTLS 1 to 3 propose a configuration in which the mass of the rotor back yoke and the inertia of the rotor are reduced by providing a lightening structure for the rotor back yoke, to improve responsiveness of the motor.

In recent years, there has been an increasing demand for further improving responsiveness of a motor in applications such as brake control of a vehicle. In compliance with this demand, it is necessary to further reduce the inertia of the rotor.

CITATION LIST

Patent Literature

PTL 1: Unexamined Japanese Patent Publication No. 2007-14178
PTL 2: Japanese Patent No. 3677752
PTL 3: Japanese Patent No. 6022077

SUMMARY OF THE INVENTION

The present invention has been made in view of the above circumstances. An object of the present invention is to provide a rotor with reduced inertia and a motor including the rotor.

In order to achieve the above object, a rotor according to the present invention includes: a shaft provided rotatably around an axis; a rotor back yoke having a through hole in an axial center of the back yoke, the through hole having the shaft be inserted through the through hole, the rotor back yoke being integrally and rotatably connected to the shaft; and a plurality of magnets fixed to an outer peripheral surface of the rotor back yoke, the plurality of magnets being disposed with magnetic poles of different polarities being arranged alternately along a circumferential direction that is a direction of an outer periphery of the rotor back yoke, wherein the rotor back yoke includes a plurality of first cutout portions provided at predetermined intervals in the circumferential direction and extending from an inner peripheral surface of the rotor back yoke radially outward in a radial direction of the rotor back yoke, and each of the plurality of first cutout portions extends along a direction parallel to the axis, from one end surface of the rotor back yoke to the other end surface of the rotor back yoke opposed to the one end surface.

According to this configuration, the mass of the rotor back yoke can be reduced, and the inertia of the rotor can be reduced.

Preferably, the plurality of magnets are provided at predetermined intervals in the circumferential direction, and magnetic poles of adjacent magnets are different from each other.

Further, the rotor back yoke preferably has an outer peripheral portion that is in contact with the plurality of magnets and that has a magnetic path that does not cause saturation of a magnetic flux.

Moreover, it is preferable that the plurality of first cutout portions are provided along an imaginary line passing through the axial center of the rotor back yoke and a center of the magnetic pole when viewed from a direction parallel to the axis.

Furthermore, the rotor back yoke may be provided with a plurality of second cutout portions on an inner peripheral surface at predetermined intervals along a direction parallel to the axis.

Further, the shaft may be provided with a plurality of tooth portions at predetermined intervals along a circumferential direction, and the plurality of tooth portions and the plurality of first cutout portions may be involute-fitted to each other.

In addition, two tooth portions that are adjacent to each other among the plurality of tooth portions and one of the first cutout portions may be involute-fitted to each other.

A motor according to the present invention at least includes: the rotor, and a stator provided at a predetermined interval outside from the rotor back yoke in the radial direction.

According to this configuration, the mass of the rotor back yoke and thus the inertia of the rotor can be reduced. Therefore, a motor having high responsiveness can be achieved.

According to the rotor of the present invention, the mass of the rotor back yoke can be reduced, and the inertia of the rotor can be reduced. According to the motor of the present invention, it is possible to achieve a motor having high responsiveness.

DESCRIPTION OF EMBODIMENTS

Hereinafter, exemplary embodiments of the present invention will be described in detail with reference to the drawings. The following description of preferred exemplary embodiments is merely exemplary in nature and is not intended to limit the present invention, its applications, or its uses at all.

First Exemplary Embodiment

[Configuration of Motor]

Figure 1:
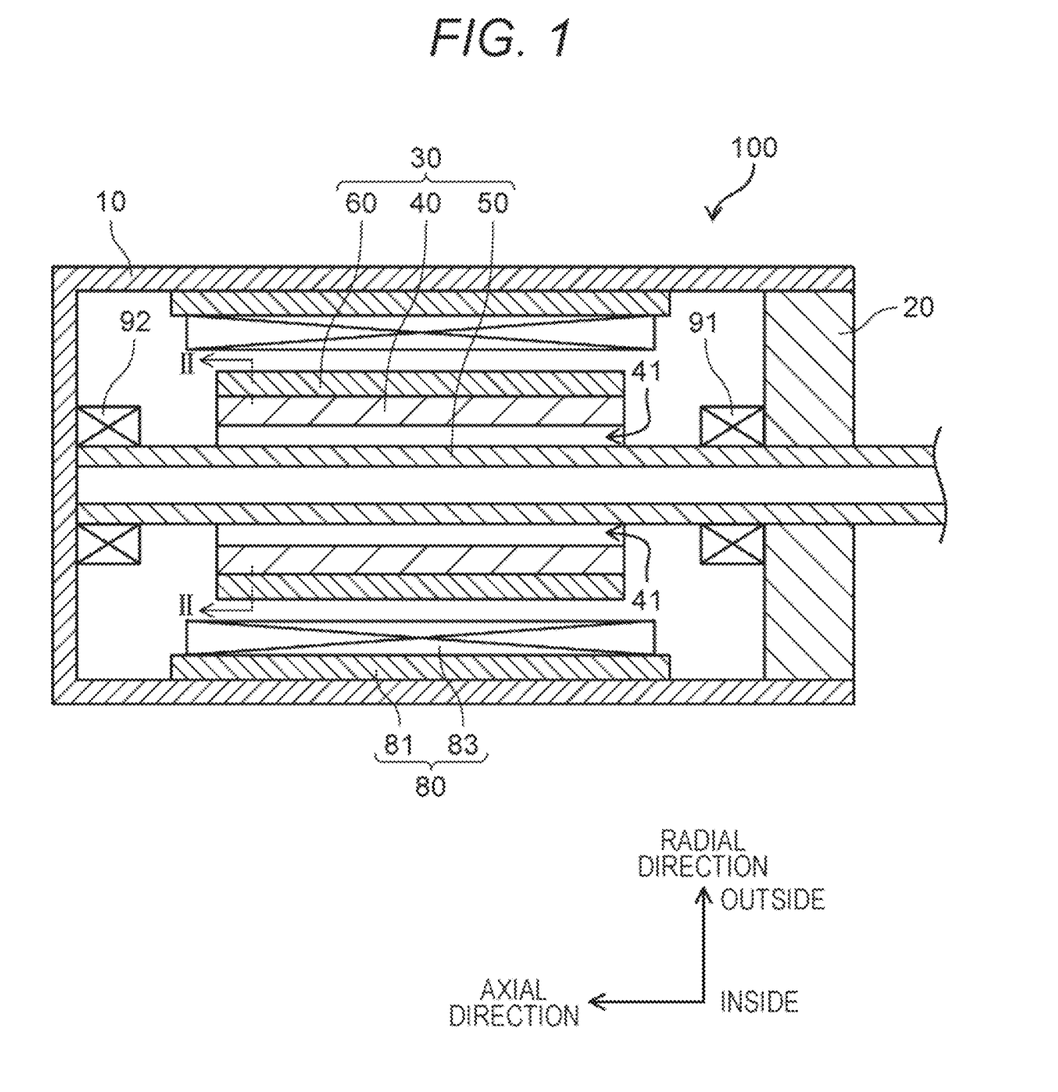
FIG. 1 is a schematic cross-sectional view of a motor according to a first exemplary embodiment of the present invention.

FIG. 1 is a schematic cross-sectional view of motor 100 according to a first exemplary embodiment of the present invention. Note that FIG. 1 schematically illustrates a structure of motor 100, and is different from the actual shape and dimensions.

As illustrated in FIG. 1, motor 100 includes motor case 10, bracket 20, rotor 30, stator 80, and bearings 91, 92. In the following description, a radial direction of rotor 30 is referred to as a radial direction, an outer circumferential direction of rotor 30 is referred to as a circumferential direction, and a direction in which shaft 50 provided in rotor 30 extends is referred to as an axial direction. A center line of shaft 50 that extends in the axial direction is referred to as an axis of rotation or simply an axis. The axial direction corresponds to a direction parallel to the axis. In the radial direction, a side of rotor back yoke 40 on the axial center is referred to as radially inside or simply inside. A side on which stator 80 is disposed is referred to as outside in the radial direction or simply outside.

Motor case 10 is a bottomed cylindrical metal member with both ends opened. Rotor 30 and stator 80 are accommodated in motor case 10. Bracket 20 is provided so as to cover the opening of motor case 10.

Rotor 30 is housed within the motor case 10. Shaft 50 is inserted through rotor back yoke 40. Rotor back yoke 40 is provided with a plurality of magnets 60 along the circumferential direction on an outer peripheral surface of rotor back yoke 40. Magnets 60 adjacent to each other have different polarities of magnetic poles. One end of shaft 50 penetrates bracket 20 and protrudes outside motor case 10. Structures and the like of rotor 30 and components of rotor 30 will be described in detail later.

Figure 3A:
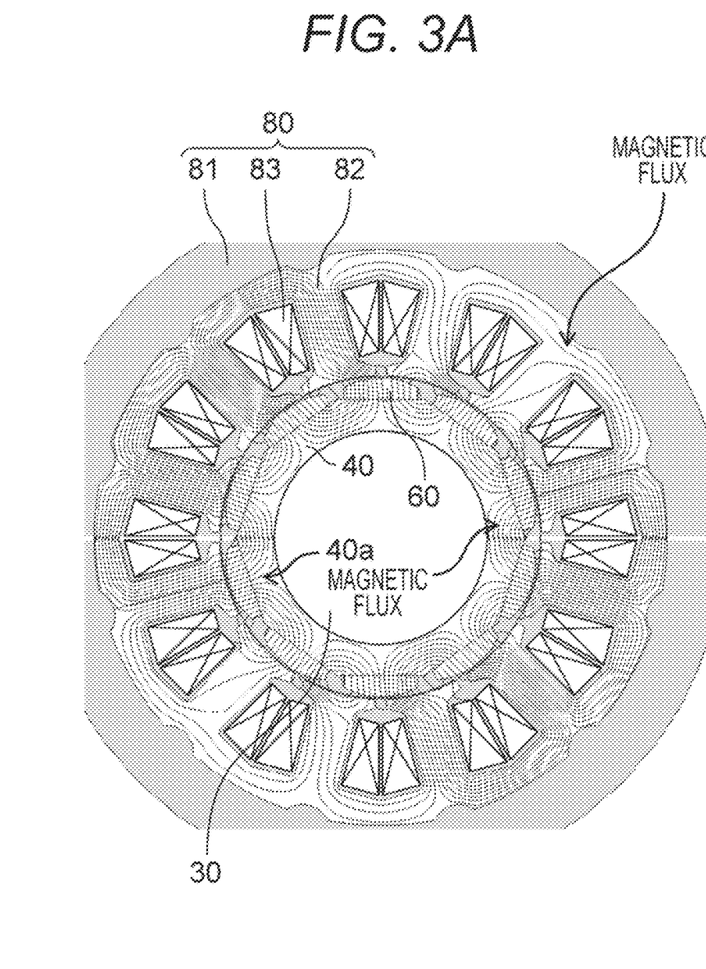
FIG. 3A is a schematic cross-sectional view illustrating a flow of a magnetic flux in a rotor and a stator.
Figure 3B:
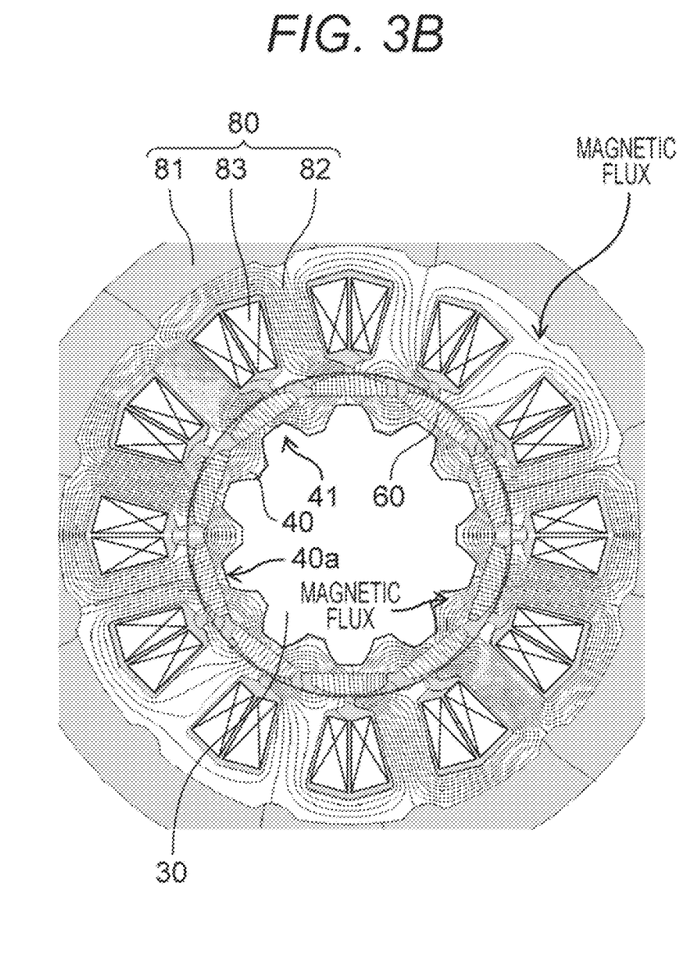
FIG. 3B is a schematic cross-sectional view illustrating the flow of the magnetic flux in the rotor and the stator.

FIG. 3A is a schematic cross-sectional view illustrating a flow of a magnetic flux in rotor 30 and stator 80. FIG. 3B is a schematic cross-sectional view illustrating a flow of a magnetic flux in rotor 30 and stator 80. Stator 80 is accommodated in motor case 10. Stator 80 is provided at a predetermined interval from rotor 30 outside in the radial direction of rotor 30. Stator 80 includes yoke 81 fixed to the inner peripheral surface of motor case 10, a plurality of salient poles 82 (see FIGS. 3A and 3B) provided at predetermined intervals along the circumferential direction of yoke 81, and a plurality of coils 83 wound around the plurality of salient poles 82.

Bearings 91, 92 are attached within motor case 10, and support shaft 50 rotatably about the axis of rotation.

As described above, motor 100 illustrated in FIG. 1 is a so-called SPM (Surface Permanent Magnet) motor in which magnets 60 are disposed on the outer peripheral surface of rotor back yoke 40.

Motor 100 operates as follows. A three-phase current having an electrical angle with a phase difference of 120° is supplied to each of the plurality of coils 83 through a power supply connection that is not shown to excite stator 80, and a rotating magnetic field is generated. The rotating magnetic field and the magnetic field generated by magnets 60 provided for rotor 30 interact with each other to generate a rotary torque in rotor 30, and shaft 50 is supported by bearings 91, 92 and rotates about the axis of rotation.

[Configuration of Rotor]

Figure 2:
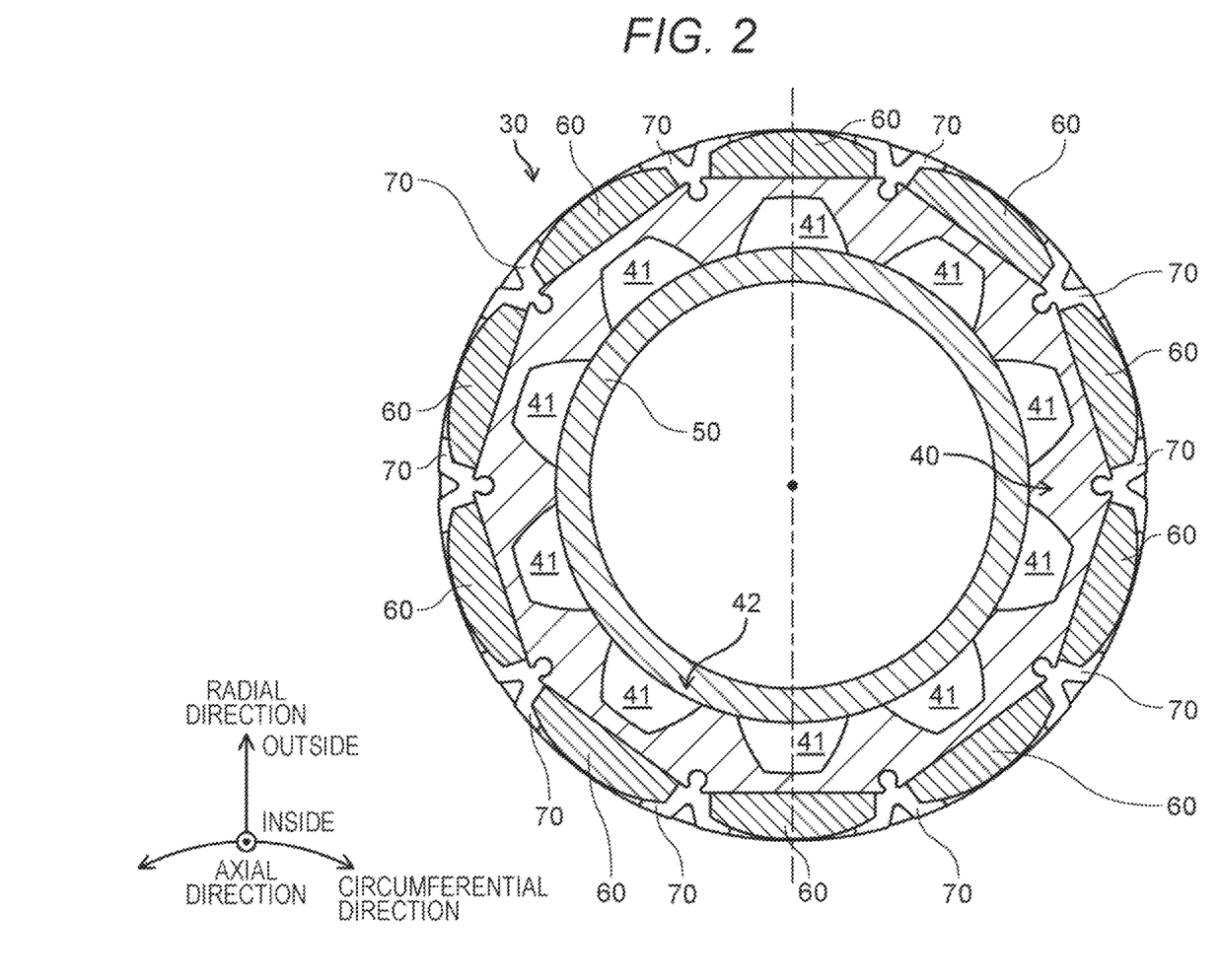
FIG. 2 is a schematic cross-sectional view showing a cross section taken along line II-II in FIG. 1.

FIG. 2 is a schematic cross-sectional view showing a cross section taken along line II-II in FIG. 1. FIG. 2 corresponds to a schematic view of the rotor in a cross section orthogonal to the axial direction. FIGS. 3A and 3B schematically illustrate the flow of the magnetic flux in the rotor and the stator. FIG. 3A shows rotor 30 and stator 80 for comparison. FIG. 3B shows rotor 30 and stator 80 according to the present exemplary embodiment. FIGS. 3A and 3B illustrate the cross sections orthogonal to the axial direction similarly to FIG. 2. For clarity of description, shaft 50 is not illustrated in FIGS. 3A and 3B.

As illustrated in FIG. 2, rotor 30 includes shaft 50, rotor back yoke 40, and the plurality of magnets 60. Shaft 50 is a so-called hollow shaft provided rotatably about the axis of rotation.

Rotor back yoke 40 has through hole 42 at the axial center. Shaft 50 is inserted into through hole 42, and rotor back yoke 40 is connected to shaft 50 integrally and rotatably. Rotor back yoke 40 is configured by a plurality of electromagnetic steel sheets of a predetermined shape in an annular shape laminated in the axial direction. Rotor back yoke 40 has a shape extending outward in the radial direction from an inner peripheral surface of rotor back yoke 40. Rotor back yoke 40 has a plurality of first cutout portions 41 provided at predetermined intervals in the circumferential direction. By shaft 50 being press-fitted into through hole 42 of rotor back yoke 40, rotor back yoke 40 is integrally and rotatably connected to shaft 50.

When viewed in the axial direction, first cutout portions 41 are provided at positions along imaginary lines passing through the axis of rotation and respectively centers of magnets 60, that is, centers of the magnetic poles. Each of the plurality of first cutout portions 41 is provided so as to extend along the axial direction, from one end surface of rotor back yoke 40 to the other end surface that faces the one end surface.

Figure 4A:
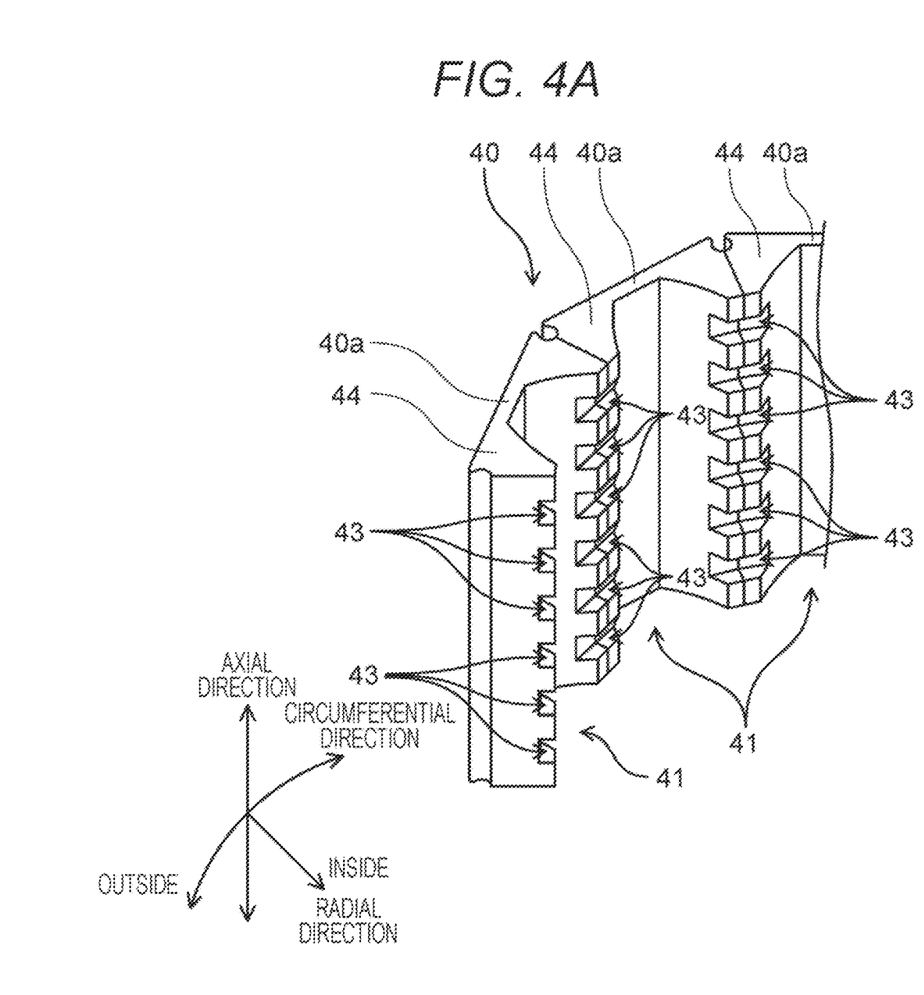
FIG. 4A is a partial perspective view of a rotor back yoke according to a modification.
Figure 4B:
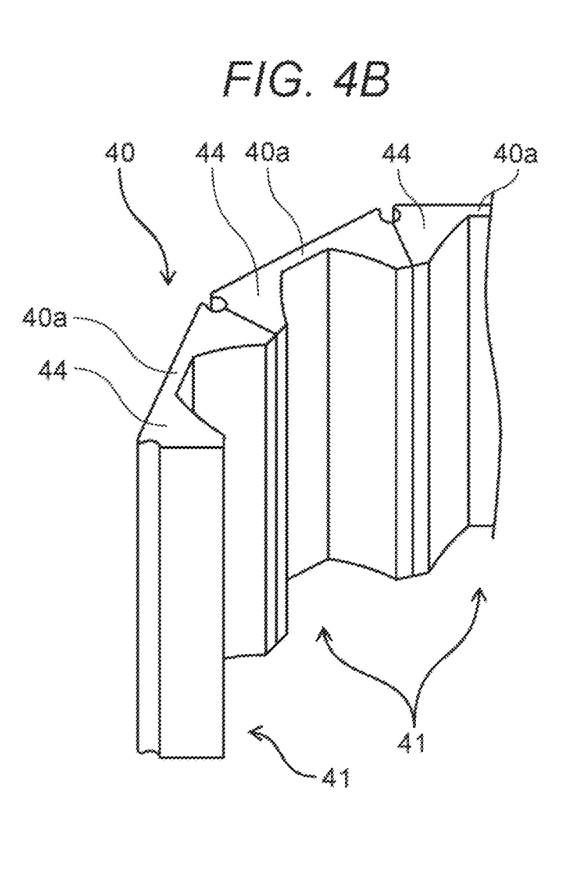
FIG. 4B is a partial perspective view of a rotor back yoke according to the first exemplary embodiment.

FIG. 4B is a partial perspective view of the rotor back yoke according to the first exemplary embodiment. Rotor back yoke 40 is configured by connecting a plurality of split back yokes 44 in the circumferential direction, in which split back yokes 44 are a plurality of electromagnetic steel sheets (not shown) of a predetermined shape being laminated in the axial direction. Each of the plurality of magnets 60 is disposed on the outer peripheral surface of rotor back yoke 40 at predetermined intervals in the circumferential direction, covered with resin mold portion 70, and fixed to the outer peripheral surface.

Motor 100 having rotor 30 configured as described above is configured such that when a current flows through a predetermined one of coils 83 provided in stator 80, a magnetic flux flows through each of stator 80 and rotor 30 as illustrated in FIGS. 3A and 3B. At this time, as shown in FIG. 3A, although a magnetic flux density is high in rotor back yoke 40 located between magnets 60 adjacent to each other, a magnetic flux density becomes low on an imaginary line passing through the axial center of rotor back yoke 40 and the center (center of the magnetic pole) of magnets 60. Therefore, as described above, by providing each of first cutout portions 41 on the imaginary line passing through the axis of rotation and the center (center of the magnetic poles) of one of magnets 60, as shown in FIG. 3B, a magnetic path that does not cause saturation of the magnetic flux is generated in outer peripheral portion 40a (see FIG. 4B) of rotor back yoke 40 in contact with magnets 60.

In this manner, motor 100 of the present exemplary embodiment has substantially the same torque as motor 100 having rotor 30 illustrated in FIG. 3A.

[Effects and the Like]

As described above, rotor 30 according to the present exemplary embodiment includes: shaft 50 provided rotatably around the axis of rotation; rotor back yoke 40 having through hole 42 in the axial center, through hole 42 having shaft 50 be inserted through through hole 42, rotor back yoke 40 being integrally and rotatably connected to shaft 50; and the plurality of magnets 60 fixed to the outer peripheral surface of rotor back yoke 40, the plurality of magnets 60 being disposed with magnetic poles of different polarities being arranged alternately along the circumferential direction that is the direction of the outer periphery of rotor back yoke 40.

Rotor back yoke 40 includes the plurality of first cutout portions 41 provided at predetermined intervals in the circumferential direction and extending from the inner peripheral surface of rotor back yoke 40 radially outward in the radial direction of rotor back yoke 40. Each of the plurality of first cutout portions 41 extends along the direction parallel to the axis, from one end surface of rotor back yoke 40 to the other end surface of rotor back yoke 40 opposed to the one end surface.

By configuring rotor 30 in this manner, the mass of rotor back yoke 40 can be reduced, and the inertia of rotor 30 can be reduced. With this, the responsiveness of motor 100 can be improved. In particular, motor 100 used for brake control is required to improve the responsiveness of motor 100 over the entire range of the speed-torque (S-T) characteristic, and this requirement can be satisfied according to the present exemplary embodiment.

In order to reduce the inertia of rotor 30, there is a case in which rotor 30 is designed such that an outer diameter of rotor back yoke 40 and a diameter of shaft 50 are closer. However, in such a case, according to the conventional configuration disclosed in PTLS 1 to 3, it is necessary to leave rotor back yoke 40 so as to surround shaft 50, and it is difficult to increase the lightening portion. Therefore, it has not been possible to sufficiently reduce the mass of rotor back yoke 40.

However, according to the present exemplary embodiment, by providing first cutout portions 41 so as to reach the inner peripheral surface of shaft 50, the mass of rotor back yoke 40 can be easily reduced. First cutout portions 41 are provided so as to reach the inner peripheral surface of rotor back yoke 40 while outer peripheral portions 40a are respectively provided. Therefore, it is possible to suppress a decrease in the torque of motor 100 while the inertia of rotor 30 is reduced.

In addition, rotor 30 of the present exemplary embodiment is useful, when a certain or larger difference is provided between the outer diameter of rotor back yoke 40 and diameter of the shaft 50. As described above, when rotor back yoke 40 is configured by connecting split back yokes 44 in which electromagnetic steel sheets are laminated in the circumferential direction, the electromagnetic steel sheets can be made in the same shape. Therefore, rotor back yoke 40 can be easily designed and assembled. Here, the strength of rotor back yoke 40 may be ensured by appropriately setting a width in the circumferential direction of first cutout portions 41.

Further, by providing first cutout portions 41 so as to extend from the one end surface to the other end surface of rotor back yoke 40 along the axial direction, the mass of rotor back yoke 40 can be further reduced.

Preferably, rotor back yoke 40 has outer peripheral portions 40a that is respectively in contact with magnets 60 and that has a magnetic path that does not cause saturation of the magnetic flux.

In this manner, the magnetic flux generated in rotor 30 can be effectively used. Therefore, a decrease in the torque of motor 100 can be suppressed.

In addition, it is preferable that each of first cutout portions 41 is provided along the imaginary line passing through the axial center of rotor back yoke 40 and the center of the magnetic pole of magnets 60 when viewed from a direction parallel to the axis of rotation, that is, when viewed from the axial direction.

In this manner, it is possible to provide a magnetic path that does not cause saturation of the magnetic flux on outer peripheral portion 40a of rotor back yoke 40 in contact with magnets 60. Therefore, the magnetic flux generated in rotor 30 can be effectively used. Therefore, a decrease in the torque of motor 100 can be suppressed.

The mass of shaft 50 can be reduced by providing shaft 50 with a hollow structure. Therefore, the inertia of rotor 30 can be further reduced. As a result, the responsiveness of motor 100 can be further improved. The strength of shaft 50, or more specifically, a material and a rate of hollowness of shaft 50 are appropriately determined according to the specification, the load, and the like of motor 100.

Preferably, the plurality of magnets 60 are provided at predetermined intervals in the circumferential direction, and the magnetic poles of adjacent magnets 60 are different from each other.

The motor according to the present exemplary embodiment at least includes: rotor 30, and stator 80 provided at a predetermined interval outside in the radial direction from rotor back yoke 40.

According to the present exemplary embodiment, the mass of rotor back yoke 40 and thus the inertia of rotor 30 can be reduced. Therefore, an SPM motor having high responsiveness can be achieved.

<Modification>

FIG. 4A is a partial perspective view of rotor back yoke 40 according to a modification. FIG. 4B is a partial perspective view of rotor back yoke 40 according to the first exemplary embodiment. In FIG. 4A, the same portions as those of the first exemplary embodiment are denoted by the same reference numerals, and detailed descriptions will be omitted.

As illustrated in FIG. 4A, the configuration according to the present modification is such that a plurality of second cutout portions 43 are provided on the inner peripheral surface of rotor back yoke 40 at predetermined intervals along the axial direction. In this point, the configuration according to the present modification is different from the configuration illustrated in the first exemplary embodiment, that is, the configuration illustrated in FIG. 4B.

According to the present modification, the mass of rotor back yoke 40 and thus the inertia of rotor 30 can be further reduced. For example, by applying rotor back yoke 40 illustrated in FIG. 3A to motor 100 illustrated in FIG. 1, it is possible to reduce the mass of rotor back yoke 40 by about 4% and the inertia of rotor 30 by about 3%, as compared with the case illustrated in the first exemplary embodiment.

Second Exemplary Embodiment

Figure 5A:
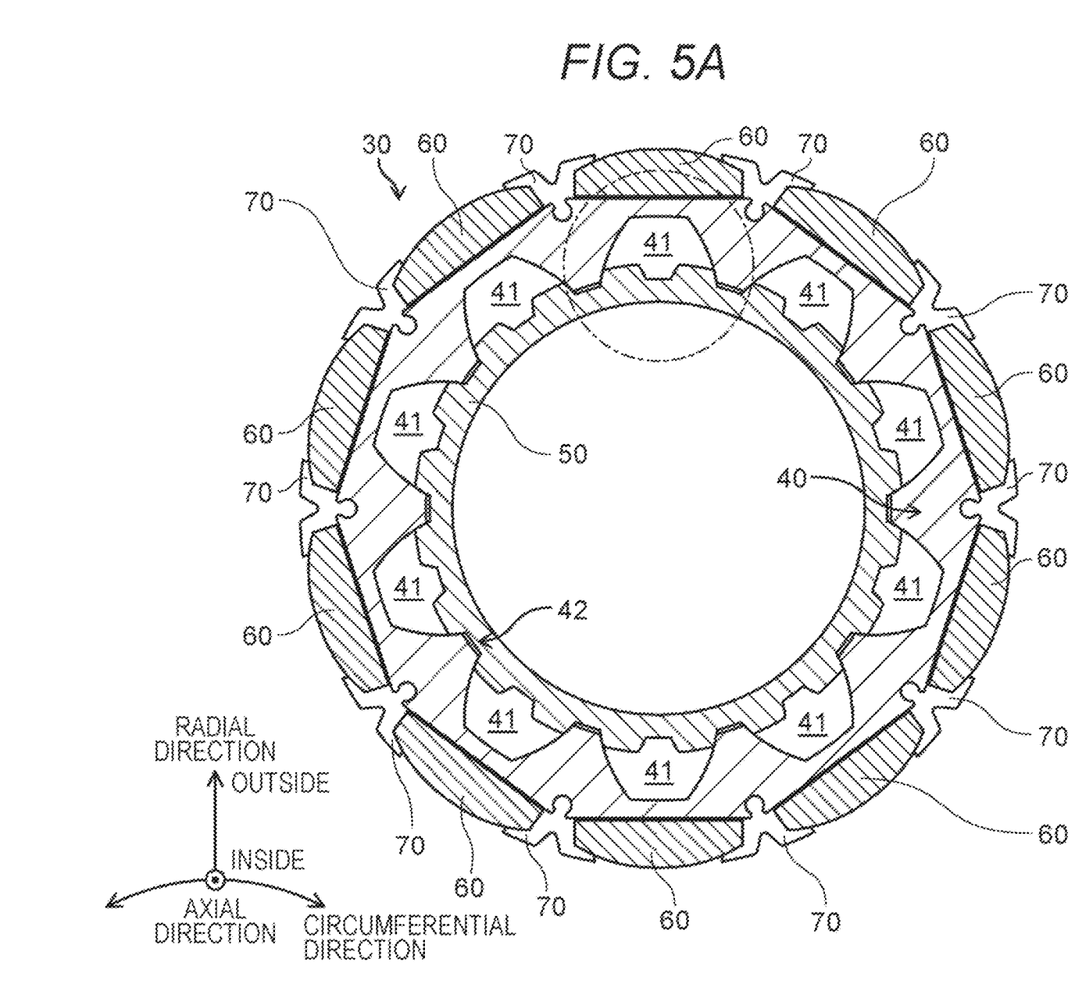
FIG. 5A is a schematic cross-sectional view of a rotor according to a second exemplary embodiment of the present invention.
Figure 5B:
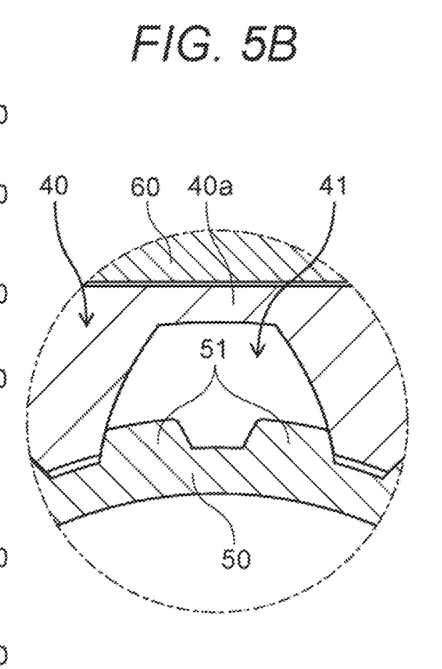
FIG. 5B is an enlarged view of a portion surrounded by a broken line in FIG. 5A.

FIG. 5A is a schematic cross-sectional view of a rotor according to a second exemplary embodiment of the present invention. FIG. 5B is an enlarged view of a portion surrounded by a broken line in FIG. 5A. In FIG. 5A, the same portions as those of the first exemplary embodiment are denoted by the same reference numerals, and detailed descriptions will be omitted.

As illustrated in FIGS. 5A and 5B, the configuration according to the present exemplary embodiment is different from the configuration according to the first exemplary embodiment in the following points. Shaft 50 is provided with a plurality of tooth portions 51 at predetermined intervals along the circumferential direction. Each of tooth portions 51 is formed by cutting out shaft 50 from the outer peripheral surface. A tooth tip of each of tooth portions 51 corresponds to the outer peripheral surface of shaft 50. Tooth portions 51 and first cutout portions 41 are involute-fitted to each other. Specifically, two tooth portions 51 that are adjacent to each other among the plurality of tooth portions 51 and one of first cutout portions 41 are involute-fitted to each other.

Further, tooth surfaces of tooth portions 51 and side surfaces of first cutout portions 41, that is, tooth surfaces of first cutout portions 41 are meshed with each other, and have shapes such that two tooth portions 51 and one first cutout portion 41 are involute-fitted to each other. In addition, the inner peripheral surface of rotor 30 is disposed at a predetermined interval from tooth roots of tooth portions 51, and the tooth tips of tooth portions 51 are similarly disposed at predetermined intervals respectively from bottom surfaces of first cutout portions 41.

According to the present exemplary embodiment, it is possible to further reduce the inertia of rotor 30 and improve the responsiveness of motor 100 as compared with the configuration of the first exemplary embodiment. Specifically, by partially reducing a wall thickness of shaft 50, the mass of shaft 50 itself can be reduced, and the inertia of rotor 30 can be further reduced.

In addition, a coupling force between shaft 50 and rotor back yoke 40 can be improved by involute-fitting of tooth portions 51 and first cutout portions 41 to each other. Therefore, during rotation of motor 100, it is possible to prevent rotor back yoke 40 from spinning out. Therefore, a decrease in the torque of motor 100 can be suppressed.

In addition, since the tooth surfaces of tooth portions 51 and the side surfaces of first cutout portions 41 are meshed with each other, management of the shapes of shaft 50 and rotor back yoke 40 is facilitated.

In the present exemplary embodiment, the example in which two tooth portions 51 adjacent to each other and the one of first cutout portions 41 are involute-fitted to each other has been described. However, the present invention is not particularly limited to this example. Three or more of tooth portions 51 adjacent to each other may be involute-fitted with one of first cutout portions 41. Further, rotor 30 may be configured as illustrated in FIG. 6A.

Figure 6A:
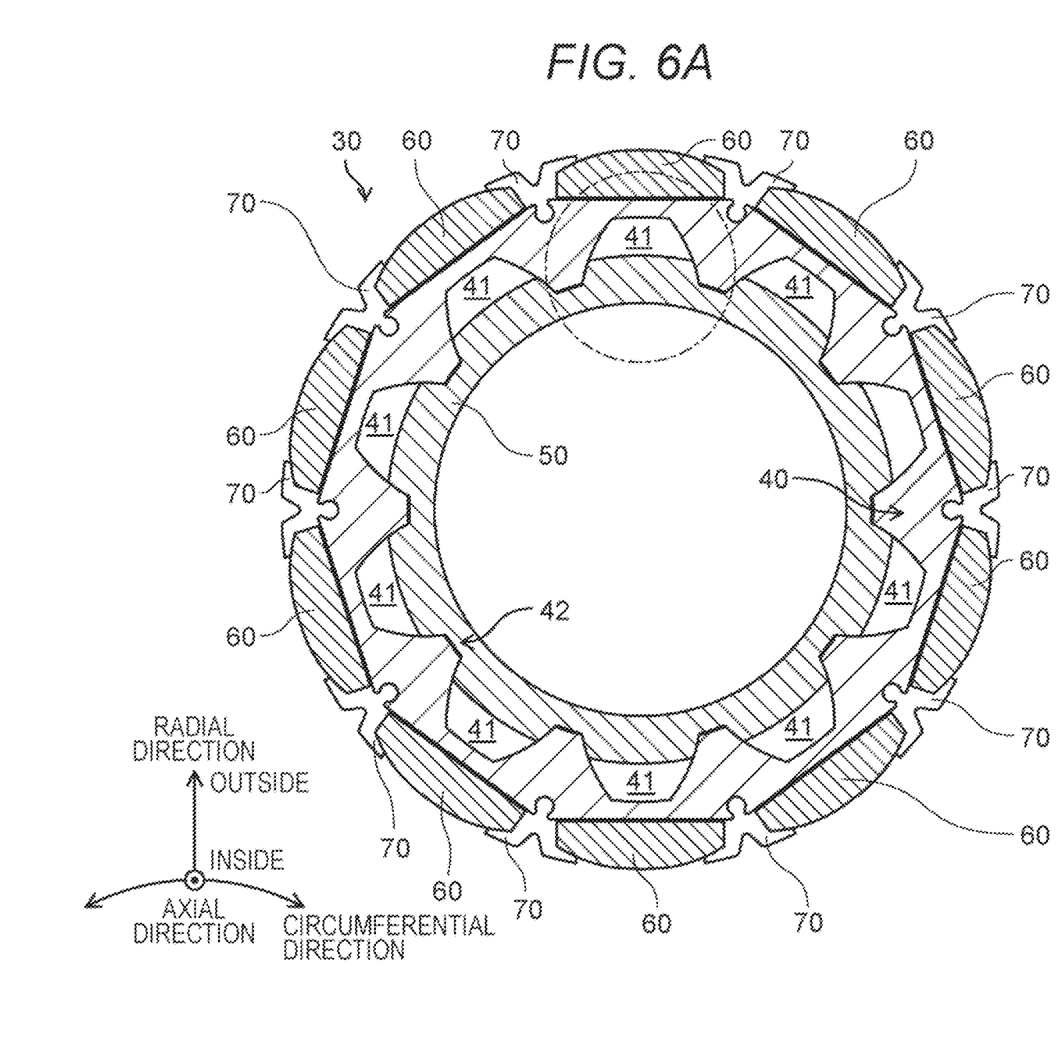
FIG. 6A is a schematic cross-sectional view of another rotor according to the second exemplary embodiment of the present invention.
Figure 6B:
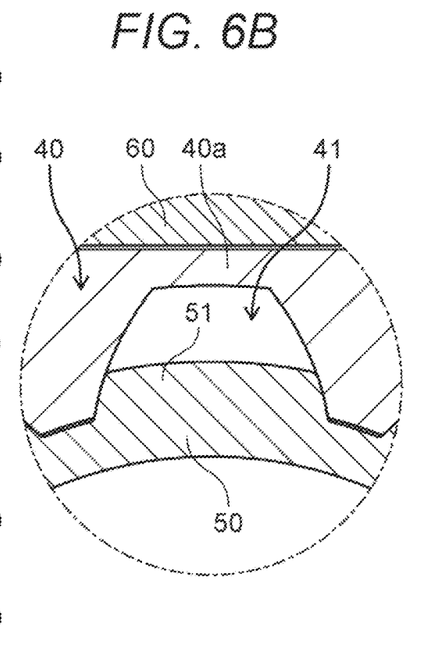
FIG. 6B is an enlarged view of a portion surrounded by a broken line in FIG. 6A.

FIG. 6A is a schematic cross-sectional view of another rotor according to the second exemplary embodiment of the present invention. FIG. 6B is an enlarged view of a portion surrounded by a broken line in FIG. 6A. In FIGS. 6A and 6B, the same portions as those of the first exemplary embodiment are denoted by the same reference numerals, and detailed descriptions will be omitted.

As illustrated in FIG. 6A, one of tooth portions 51 and one of first cutout portions 41 may be involute-fitted to each other.

By configuring rotor 30 such that the plurality of tooth portions 51 are involute-fitted to one of first cutout portions 41, a volume of tooth portions 51 and the mass of shaft 50 can be even further reduced. As a result, the inertia of rotor 30 can be even further reduced.

As described above, rotor 30 of the present exemplary embodiment may be configured such that shaft 50 may be provided with the plurality of tooth portions 51 at predetermined intervals along the circumferential direction, and the plurality of tooth portions 51 and the plurality of first cutout portions 41 may be involute-fitted to each other.

In addition, two tooth portions that are adjacent to each other among the plurality of tooth portions 51 and one of the plurality of first cutout portions 41 may be involute-fitted to each other.

Other Exemplary Embodiments

A new exemplary embodiment can be made by appropriately combining the components illustrated in the first and second exemplary embodiments including the modification. For example, second cutout portions 43 according to the modification may be applied to rotor back yoke 40 according to the second exemplary embodiment. Moreover, as long as the required performance of motor 100 is satisfied with respect to the inertia of rotor 30, shaft 50 may have a solid structure.

Further, for the first and second exemplary embodiments including the modification, the example in which the plurality of magnets 60 are fixed to the outer peripheral surface of rotor back yoke 40 has been described. However, annular magnet 60 in which different magnetic poles are alternately arranged along the circumferential direction may be fixed to the outer peripheral surface.

A method of connecting shaft 50 and rotor back yoke 40 is not limited to press-fitting, and a different method may be used. For example, shaft 50 and rotor back yoke 40 may be joined to each other by laser welding.

INDUSTRIAL APPLICABILITY

According to the rotor of the present invention, it is possible to reduce the mass of the rotor back yoke and the inertia of the rotor, and is useful for application to an SPM motor requiring high responsiveness.

REFERENCE MARKS IN THE DRAWINGS

10: motor case
20: bracket
30: rotor
40: rotor back yoke
40a: outer peripheral portion
41: first cutout portion
42: through hole
43: second cutout portion
44: split back yoke
50: shaft
51: tooth portion
60: magnet
70: resin mold portion
80: stator 81: yoke
82: salient pole
83: coil
91, 92: bearing
100: motor

The invention claimed is:

1. A motor comprising:
a rotor comprising:
   a shaft provided rotatably around an axis;
   a rotor back yoke having a through hole in an axial center of the back yoke, the through hole having the shaft be inserted through the through hole, the rotor back yoke being integrally and rotatably connected to the shaft; and
   a plurality of magnets fixed to an outer peripheral surface of the rotor back yoke, the plurality of magnets being disposed with magnetic poles of different polarities being arranged alternately along a circumferential direction that is a direction of an outer periphery of the rotor back yoke; and
a stator provided at a predetermined interval outside in the radial direction from the rotor back yoke, wherein:
the rotor back yoke includes a plurality of first cutout portions provided at predetermined intervals in the circumferential direction and extending from an inner peripheral surface of the rotor back yoke radially outward in a radial direction of the rotor back yoke,
each of the plurality of first cutout portions extends along a direction parallel to the axis, from one end surface of the rotor back yoke to the other end surface of the rotor back yoke opposed to the one end surface,
a space is formed between the rotor back yoke and the shaft, and
a plurality of first cutout portions is provided along an imaginary line passing through the axial center of the rotor back yoke and a center of the magnetic pole when viewed from a direction parallel to the axis, the plurality of first cutout portions being provided at a portion where a magnetic flux density is low.

2. The motor according to claim 1, wherein:
the plurality of magnets are provided at predetermined intervals in the circumferential direction, and
magnetic poles of adjacent magnets are different from each other.

3. The motor according to claim 1, wherein the rotor back yoke has an outer peripheral portion that is in contact with the plurality of magnets and that has a magnetic path that does not cause saturation of a magnetic flux.

4. The motor according to claim 1, wherein the rotor back yoke is provided with a plurality of second cutout portions on an inner peripheral surface at predetermined intervals along a direction parallel to the axis.

5. The motor according to claim 1, wherein:
the shaft is provided with a plurality of tooth portions at predetermined intervals along the circumferential direction, and
the plurality of tooth portions and the plurality of first cutout portions are involute-fitted to each other.

6. The motor according to claim 5, wherein two tooth portions adjacent to each other among the plurality of tooth portions and one of the plurality of first cutout portions are involute-fitted to each other.

7. The motor according to claim 1, wherein the rotor back yoke is configured by connecting split back yokes in which electromagnetic steel sheets are laminated in the circumferential direction.

* * * * *